June 23, 1959  H. JUNGHANS ET AL  2,891,456
CENTERING SHUTTER FOR PHOTOGRAPHIC CAMERAS
Filed March 29, 1952  8 Sheets-Sheet 1

INVENTORS
HELMUT JUNGHANS
KURT VON ZEPPELIN
RUDOLF WEBER
By Haseltine, Lake & Co.
AGENTS June 23, 1959  H. JUNGHANS ET AL  2,891,456
CENTERING SHUTTER FOR PHOTOGRAPHIC CAMERAS
Filed March 29, 1952  8 Sheets-Sheet 2

Inventors:
HELMUT JUNGHANS
KURT VON ZEPPELIN
RUDOLF WEBER
By: Haseltine, Lake & Co
AGENTS INVENTORS:
HELMUT JUNGHANS
KURT VON ZEPPELIN
RUDOLF WEBER
By: Haseltine, Lake & Co
AGENTS June 23, 1959  H. JUNGHANS ET AL  2,891,456
CENTERING SHUTTER FOR PHOTOGRAPHIC CAMERAS
Filed March 29, 1952  8 Sheets-Sheet 6

INVENTORS:
HELMUT JUNGHANS
KURT VON ZEPPELIN
RUDOLF WEBER
By-
Haseltine, Lake & Co.
AGENTS June 23, 1959  H. JUNGHANS ET AL  2,891,456
CENTERING SHUTTER FOR PHOTOGRAPHIC CAMERAS
Filed March 29, 1952  8 Sheets-Sheet 7

INVENTORS:
HELMUT JUNGHANS
KURT VON ZEPPELIN
RUDOLF WEBER
By: Haseltine, Lake &Co
AGENTS June 23, 1959    H. JUNGHANS ET AL    2,891,456
CENTERING SHUTTER FOR PHOTOGRAPHIC CAMERAS
Filed March 29, 1952    8 Sheets-Sheet 8
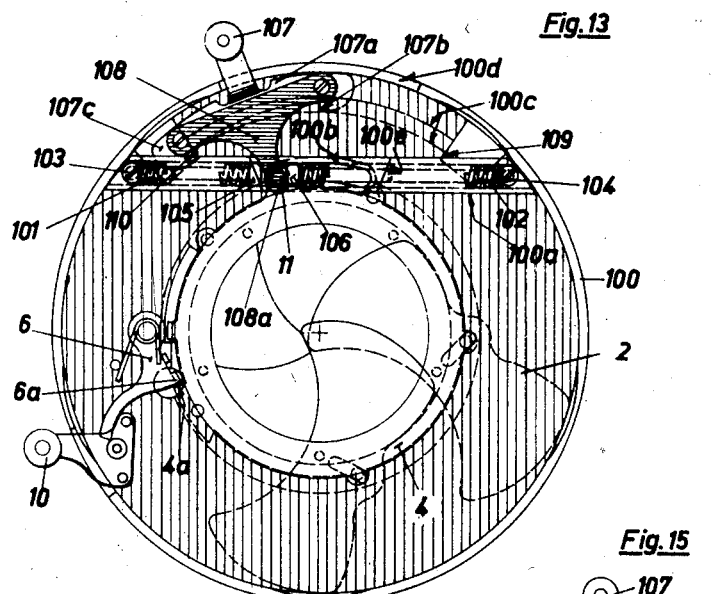
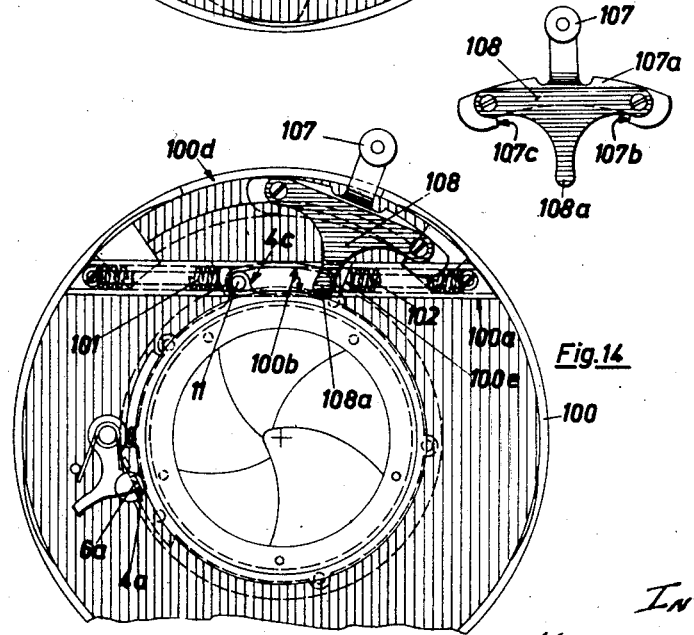
Inventors:
Helmut Junghans
Kurt von Zeppelin
Rudolf Weber
By
Haseltine, Lake & Co
Agents

United States Patent Office 2,891,456
Patented June 23, 1959

2,891,456

CENTERING SHUTTER FOR PHOTOGRAPHIC CAMERAS

Helmut Junghans, Schramberg-Sulgen, and Kurt von Zeppelin and Rudolf Weber, Schramberg, Wurttemberg, Germany Application March 29, 1952, Serial No. 279,396

Claims priority, application Germany March 30, 1951

14 Claims. (Cl. 95—63)

The present invention relates to centering shutters for photographic cameras having double blades opening and shutting in the same, but alternately after every exposure reversed, rotary direction, which shutters are coupled with a drive element cooperating with a release member.

An object of the invention is to provide centering shutters suitable for exposure times in the order of 1/1000 of a second.

The invention is based on the problem of finding a drive mechanism for transmitting, in as short as possible a time and without the use of intermediate inert members, a drive energy to the drive members of shutter blades.

Primarily the invention consists of providing a bilaterally acting energy storage capable of being alternately coupled with the blade drive member for the transmission of energy directly in opposite directions, an arrangement of a single tension member for energy storage, and means for alternately disengaging and simultaneously tensioning a portion of the energy storage not engaged in driving the blade drive member.

This kind of an arrangement offers the advantage that the energy storage halves may, without the use of inert direction changing elements, actuate the drive member practically directly and that, as has been demonstrated by extensive tests, exposure times in the order of 1/1000 of a second can be attained.

With a shutter having the fundamental characteristics of the invention described above it may happen that a release lever, or an intermediate lever attached thereto, has a braking effect on the blade drive member which may occur when the release lever, after having been pushed downward is released in this case, friction results between the locking member and the blade drive member cooperating with it.

With a camera shutter of the described kind it is also desirable to provide indicating devices showing that the shutter is tensioned. On the other hand, it must be avoided that the respective indicating member is returned to its initial position during the actual releasing movement. For the purpose of obtaining, with shutters according to the invention, exposure times as short as 1/1000 of a second, the masses moved during the operation of the shutter have to be kept as small as possible.

In order to be able to attain these improvements with a shutter according to the invention, a timing device is provided that releases the shutter after a predetermined period of time and reconducts the shutter tension lever from the terminal position of its tensioning movement to its initial position before the actual release of the shutter takes place.

Consigning the actuation of the shutter release to a special timing device provided with its own drive insures that the release always takes place under the same chronological and mechanical conditions and that the cooperating parts do not impede one another. Arranging the timing of the shutter tension lever in such a way that the tension lever up to the time the shutter is released indicates the state of tension and after the release is reconducted to its initial position so as not to impede the operation of the shutter improves the operation of the shutter without in any way impairing its functioning.

With the preferred construction of the timing device, provision is made for preparing during its escape movement the release of the shutter in order to reduce to a minimum the forces and the movements involved in the actual release.

Finally, the timing device may advantageously participate in initiating and/or carrying-out further functions connected with exposure operations such as synchronization of flash bulb ignition. According to an additional characteristic of the invention, the timing device may therefore serve as a synchronizing mechanism and in this connection is distinguished by a relatively large retarding time and reliable operation.

Further characteristics of the improvements described above relate to the actuating connections between the synchronizing device and a fore-running device incorporated in the shutter housing.

Many embodiments of the present invention are possible and several are described below. In the accompanying drawings:

Fig. 13 is a front view of a third form of construction prior to tensioning and after counterclockwise rotation of the blade drive member;

Fig. 14 illustrates the shutter according to Fig. 13 in tensioned state and ready for release, following which the blade drive member will be moved in clockwise direction; and Fig. 15 shows a detail of the shutter according to Figs. 13 and 14.

Figure 1:
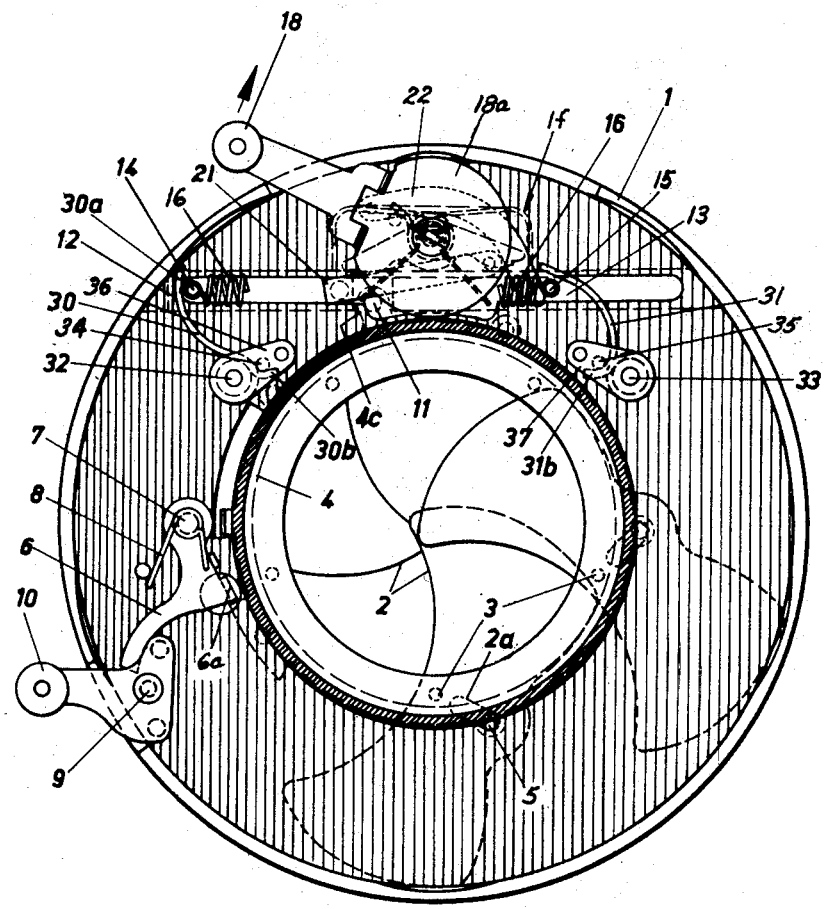
Fig. 1 is a front view of a centering shutter prior to tensioning and after a prior counterclockwise rotation of the drive member of the blades.

In Figs. 1–5, five double blades 2 are journalled pivotally on pins 3 on a housing 1. Both blades are driven by a ring 4, hereinafter designated as the blade drive ring; it carries drive pins 5 which engage slots 2a in the blades 2. The blade drive ring 4 cooperates with a trigger lever 6 journalled on pivot 7 and influenced by a spring 8 tending to rotate it counterclockwise. The trigger lever 6, which is actuated by a release lever 10 journalled at 9, has a lug 6a capable of cooperating with abutments 4a and 4b (Fig. 5) on the blade drive ring 4 in such a way that it is in contact with abutment 4a during clockwise rotation of the blade drive ring and with the abutment 4b during the counterclockwise rotation of the blade drive ring of the following exposure. The shutter parts described so far correspond to those conventionally used; the present invention relates to the drive of the blade drive ring and the means serving this purpose are described as follows:

The blade drive ring 4 has an eye lug 4c carrying a stop pin 11 which is movable in an arc-like recess 1a (Fig. 3) of the housing 1. The edges 1b and 1c limit its movements.

Extending practically tangentially to the path of the driving eye-lug 4c, a guide way 1d for a pair of slides 12 and 13 is recessed in the housing 1. These slides have just such a length that, when they are in their extreme outer position (Figs. 2, 4 and 5), the eye lug 4c can move freely between their front edges 12a and 13a. The outer position of the slides is determined by pins 14 and 15 inserted close to their outer ends abutting the ends of the guide slot 1e which is recessed above the slide guide 1d in the housing 1 and made somewhat narrower than this guide.

Tensioned between the anchoring pins 14 and 15 is a helical drive spring 16. The following device is provided for tensioning the drive spring 16. Pivotally journalled on a stud 17 is a tension lever 18, on the disk-like hub 18a by means of pins 19 and 20 (Fig. 3) tension rods 21 and 22 are linked. At the free ends of the tension rods, guide blocks 23 and 24 are fastened which are guided in the slot 1e, and the tension rods 21 and 22 are made of such a length that, with their heads 21a and 22a resting against the spring anchoring pins 14 and 15, they can shove them to the ends of the slot 1e when the tension lever 18 is moved to tensioning position (Fig. 2).

A pull-back spring 25 attached with one end to the pin 17 and with the other to the hub 18a at 26 serves to reconduct the tension lever 18 to its initial position (Fig. 1).

Figure 2:
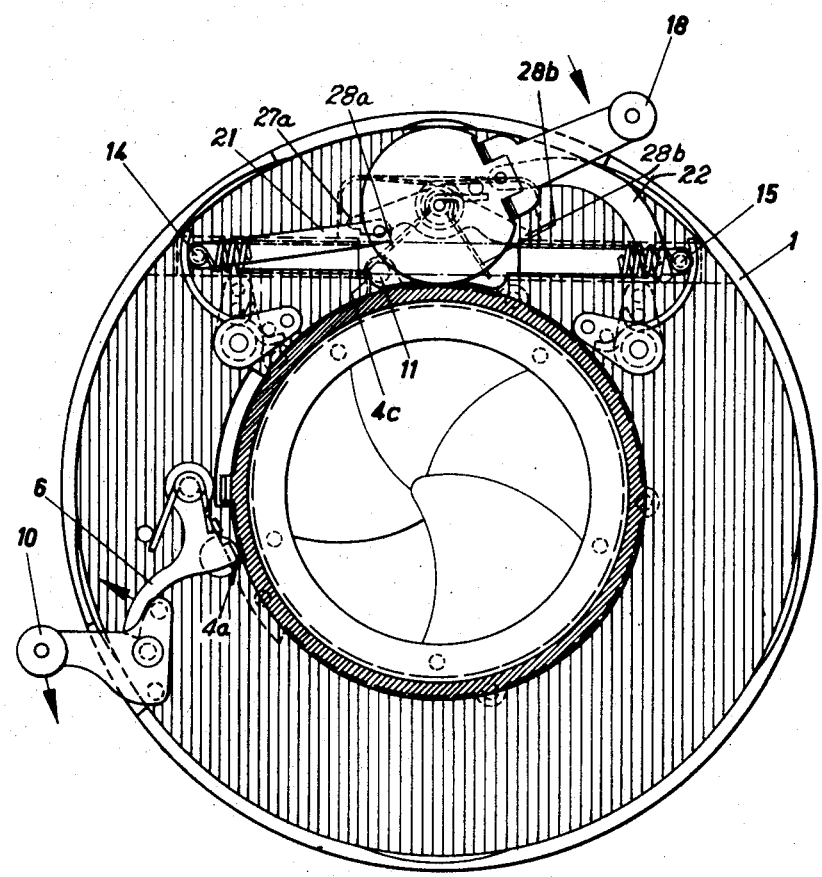
Fig. 2 is a front view in which is shown the relative positions of the parts of the shutter according to Fig. 1 after the tensioning of the previously released half of the energy storage unit.
Figure 3:
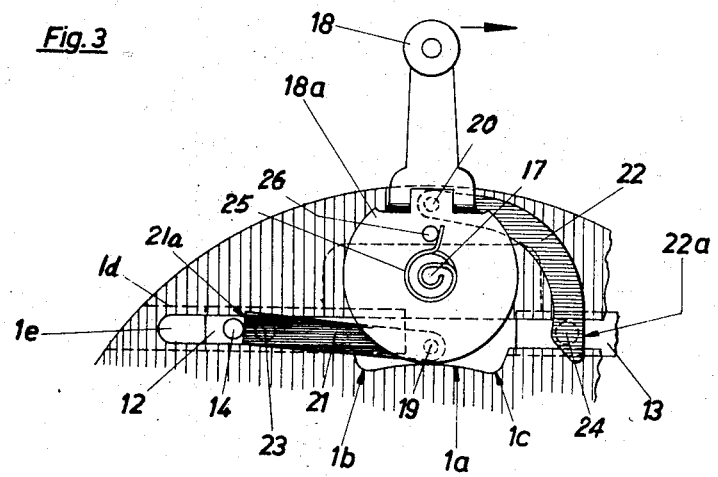
Figs. 3–5 show details of the tensioning device of the shutter according to Figs. 1 and 2.
Figure 4:
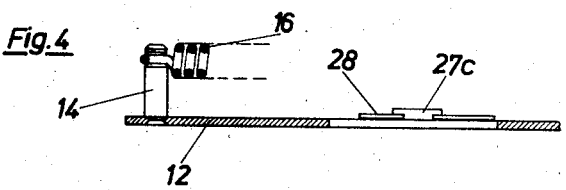
Figure 5:
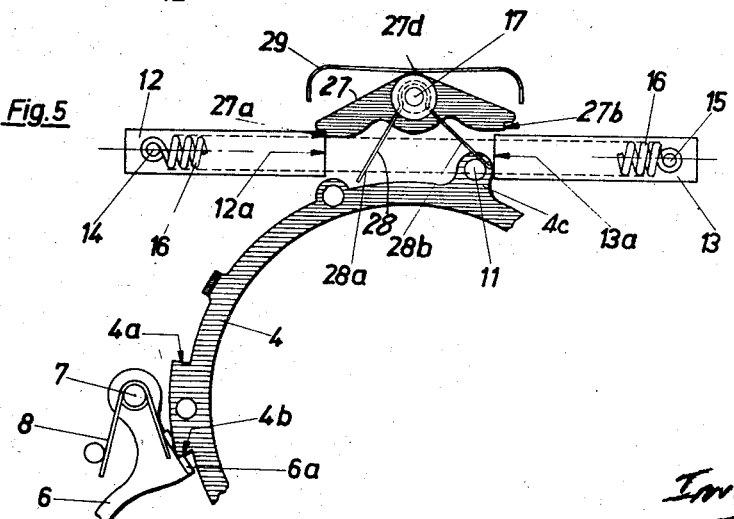
Figure 6:
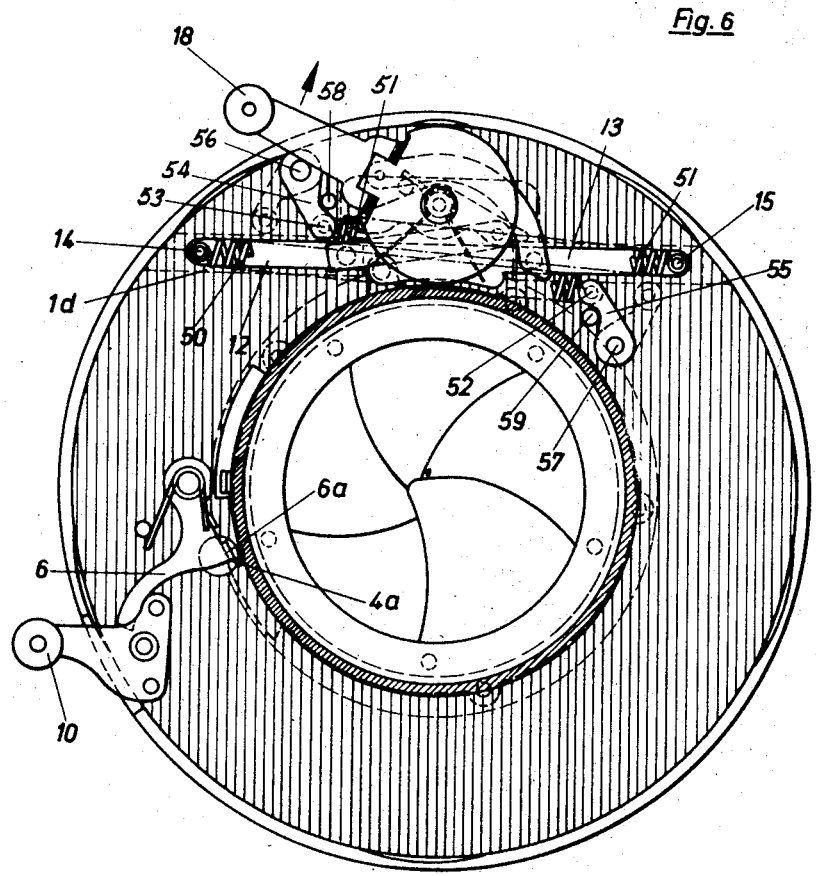
Fig. 6 illustrates a front view of a second form of construction in tensioned state, with the tensioning device at rest.
Figure 7:
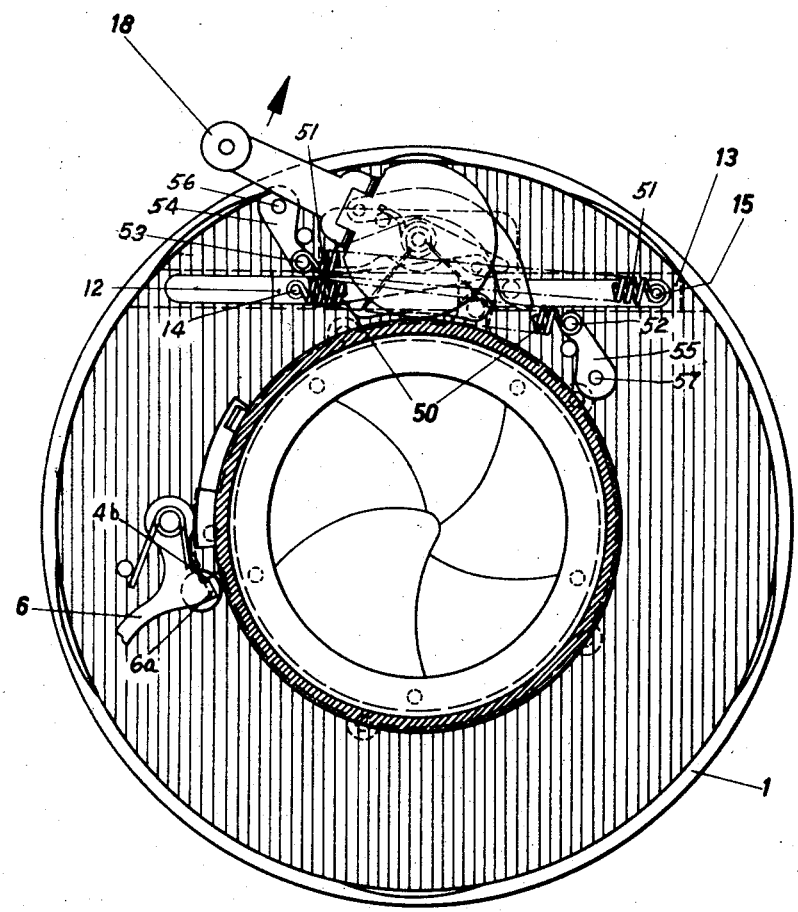
Fig. 7 shows a shutter according to Fig. 6 prior to tensioning and after release is effected and clockwise movement of the blade drive member is initiated.
Figure 8:
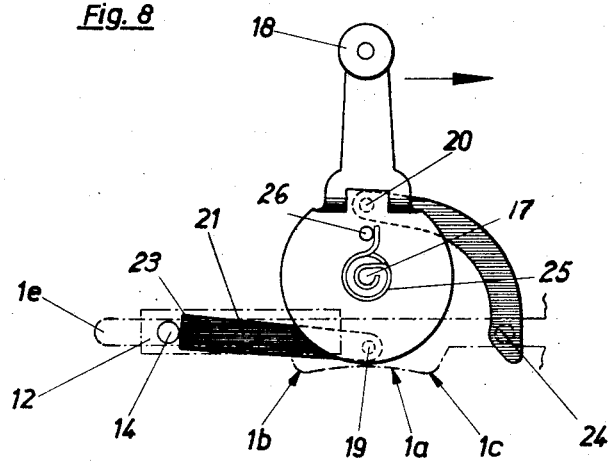
Figs. 8 and 9 show details relating to Figs. 6 and 7.
Figure 9:
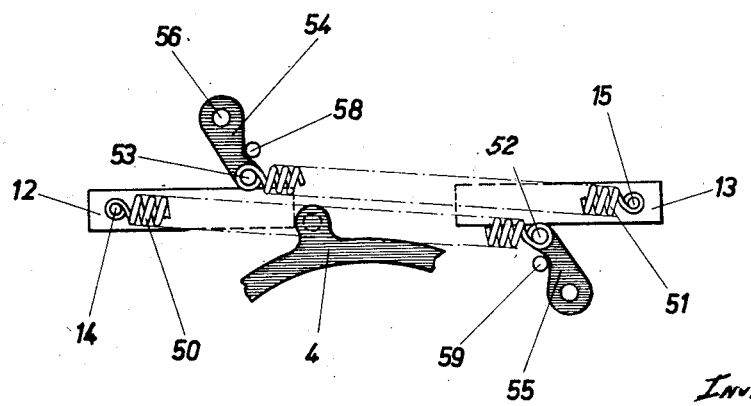

The means described so far are adequate for holding the blade drive ring 4 in its terminal position as well as for tensioning the drive spring and setting one half of the energy storage unit, consisting of the drive spring 16 and the two slides 12 and 13, against the blade drive ring 4 (in Fig. 2 this would be slide 12), but they do not suffice to prevent an expansion, after the release of the tension lever 18 of the other half of the energy storage unit (in this example the slide 13 would move toward the left, Fig. 2). For the purpose of alternately disengaging one half of the energy storage unit from the tensioning mechanism and applying the entire drive energy by way of the other half to the blade drive ring 4, the following arrangement has been provided. A double-armed rocking lever 27 is actuated by the stop pin 11 on the blade drive ring 4 by way of spring fingers 28a and 28b (Fig. 5) forming portions of the hairpin spring 28 which is riveted to the hub 27c of the rocking lever 27. As is shown in Fig. 2, the rocker 27 is actuated by the blade drive ring 4 by way of the pin 11 and spring fingers 28a in such a way that the blocking of the driving slide (12 in Fig. 2, 13 in Fig. 5) at the next following tensioning of the shutter is being prepared. This is effected in such a way that the pin 11 toward the end of its movement strikes one of the spring fingers 28a or 28b and submits it to a preliminary tensioning. As will be described hereinafter, the pushing of the pin 11 against one of the spring fingers 28a or 28b does not immediately lead to a change-over of the rocking lever 27; this does not take place until the slide just being blocked by the rocker 27 is released at the end of the tensioning movement.

With respect to the setting of the shutter to "time," for which the driving eye-lug of the blade drive ring 4 has to be in a central position with regard to the recesses 1a, 1b, 1c, the back of the rocker 27 is shaped at 27d (Fig. 5) like the ridge of a roof, and a tipping spring 29 is inserted into a recess 1f (Fig. 1) of the housing 1 for preventing the rocker 27 from resting in its central position and forcing it to occupy always one of its end positions so that, at a following setting of the shutter to instantaneous exposure, it is ready for blocking.

The mode of operation of the shutter will now be described as follows:

*Tensioning of the shutter.*—Tension lever 18 (Fig. 1) is pivoted in clockwise direction; the tension rods 21 and 22 are thereby spread apart, rotate around 19 and 20 and their guide blocks 23 and 24 slide in the slot 1e. With its head 22a pushing against the spring pin 15 on the slide 13, the rod 22 shoves the slide 13 under simultaneous tensioning of the drive spring 16 outward until the pin 15 strikes the end of the slot 1e. The rod 21 first slides forward unimpeded, since the slide 12 is in blocked tensioned position. This blocking is for the time being still effected by the rocker lever 27, because the slide 12 with its edge 12a is held in place under tension of the spring 16 by the edge 27a of the rocker 27. Although the drive pin 11 of the blade drive ring 4 keeps the spring finger 28a of the rocker 27 under preliminary tension, this tension is not sufficient to release the hold of the blocking elements 12a and 27a, and to let the rocker 27 carry out its clockwise pivoting movement. This condition (see Fig. 1) is changed during the further course of the tensioning when the tension rod 21 with its head 21a strikes the pin 14. The path of the rods 21 and 22 for effecting the tensioning is purposely made longer than would correspond to the terminal position of the pins 14 and 15 when the respective slide is blocked by the rocker 27. For this reason, the pin 14 is shifted at the end of the tensioning movement a little beyond its position as shown in Fig. 1 by the rod 21, so that the shoulder 27a on the rocker 27 is released from the pressure of the slide edge 12a. The rocker 27 can now follow the tension of the spring finger 28a and tilt over in clockwise direction (see now Fig. 2). The shoulder 27b of the rocker 27 now enters the path of the slide 13, the edge 13a of which on account of the overextended stroke bears indirectly against the shoulder 27b. As soon as the tension lever 18 is released, it is pulled back to its initial position by the pull-back spring 25, and the slide 12 can move inwardly a little until its edge 13a strikes the shoulder 27b of the rocker 27. The shutter is now tensioned and at its release the described parts cooperate in the following way: The release lever 10 is pushed down in the direction of the arrow and swings the trigger lever 6 also in this direction. The lug 6a of the trigger 6 slides off the abutment 4 on the blade drive ring 4; the slide 12 resting with its edge against the drive eye lug 4c drives the blade drive ring 4 in clockwise direction thus causing the opening and shutting of the blades 2 in clockwise direction.

The length of time the shutter is kept open during this movement is determined by an impedance device (not shown) of conventional design. The driving movement of the slide 12 is terminated when the pin 11 has reached the edge 1c of the recess 1a. Before the pin 11 arrives at this terminal position it strikes against the spring finger 28b and tensions it; but this tension can, as has been explained before, have no effect on a tipping-over of the rocker 27, since the friction pressure on the shoulder 27 exerted by the slide 13 is greater than the torque acting on the rocker lever 27.

The slide 13 therefore is at rest as long as the slide 12 is engaged in moving the blades. When now, as already described above, the shutter is tensioned again, the respective parts of the drive change their functions, e.g. the slide 12 is blocked after the tensioning in neutral position and the slide 13 takes over the drive.

For the purpose of increasing the driving power when using shortest exposure times, an additional pair of springs 30 and 31 is provided; these springs are made in the shape of leg springs and are mounted on pins 32 and 33, secured to the housing 1, so that the legs 30a of the springs can come in contact with the spring anchoring pins 14 and 15, respectively, when the additional springs are put in action; in this case they are tensioned simultaneously with the main drive spring 16. In order to be able to engage and disengage the additional springs 30 and 31, the abutment for the shorter spring leg 30b, or 31b, respectively, can be shifted. For this purpose, the abutment pins 34 and 35 are secured to one-armed levers 36 and 37, respectively, pivotally mounted on pins 32 and 33, respectively. The device serving this purpose can be arranged on the front plate of the shutter, for example, in the shape of a cam, the design of which is conventional so that for the sake of clarity it is not shown in the drawing. In Fig. 1, the additional springs 30 and 31 are shown in the operative position, as also in Fig. 2 where, however, the inoperative position of the levers 36 and 37 are shown in dotted lines.

The centering shutter according to the second example of construction (Figs. 6–9) is similar to the shutter according to the first example with regard to construction and mode of operation (Figs. 1–5). The construction differs only in that, instead of having a single spring, there are provided two springs 50 and 51. In the same way as in the first example, these springs are hooked onto the pins 14 and 15 of the drive slides 12 and 13 with one end, while with their other ends they are hooked onto pins 52 and 53 secured to the free ends of levers 54 and 55. The levers 54 and 55 are rotatably mounted on pins 56 and 57 for the purpose of providing the springs with an additional tension when setting the shutter to shortest exposure times. In their inactive position, the levers rest against the stop pins 58 and 59, while in their operative state they lie in the position shown in dotted lines. The device for their common setting, as for example a double cam, is arranged on the rotatable front plate of the shutter, but for the sake of clarity is not shown in the drawing.

Due to the lateral shifting of the hooking-in points 52 and 53 of the springs connected to the housing adjacent to the guide ways 1d and 1e, the slides 12 and 13 lie oblique to this guide way and extend part of their length parallel to each other; for that reason they can be made longer, so that they possess more windings than a single spring as used in the first example, therefore have a better characteristic and higher fatigue strength.

Figure 10:
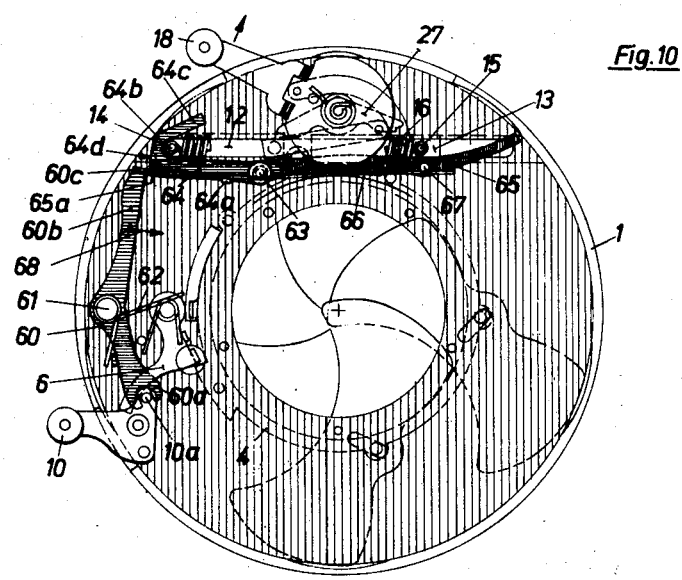
Fig. 10 illustrates a shutter according to Figs. 1 and 2 with a device for blocking the shutter release member in operative position after the counterclockwise rotation of the blade drive member.
Figure 11:
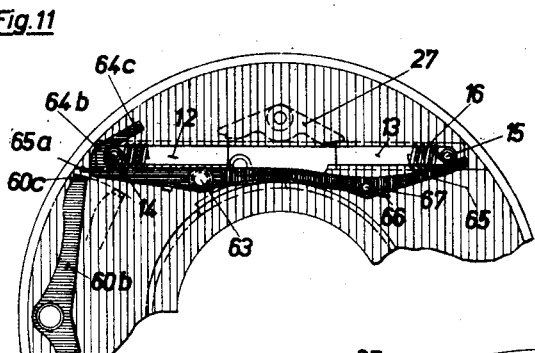
Fig. 11 illustrates the release locking device according to Fig. 10 in inoperative position.
Figure 12:
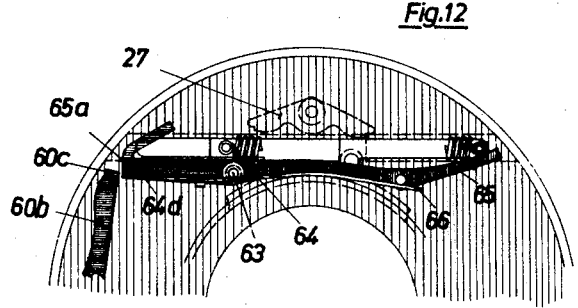
Fig. 12 shows the release locking device according to Fig. 10 in operative position after the clockwise rotation of the blade drive member.

An additional device for the centering shutter according to the first example (Figs. 1–5) which may also be used with the second example (Figs. 6–9) is shown in Figs. 10–12. This device serves to block the shutter release lever 10 (Fig. 10) against actuation when the shutter is not tensioned, in order to call the attention of the camera user to the necessity of tensioning it, and also to prevent, with cameras having a film blocking device actuated by way of the shutter release member, the film feeding device from being released by an erroneous actuation of the shutter release lever.

The device comprises a double-armed lever 60, hereinafter designated as the intermediate lever, pivotally mounted at 61 on the housing 1 and subject to the action of a pull-back spring 62. Secured to the release lever 10 and engaged by the forked lever arm 60a is a pin 10a against which bears also the trigger lever 6 for the blade drive ring 4. The other arm 60b, the end of which at 60c is bent at a right angle, extends to the tension and drive device with tension lever 18, slides 12 and 13, drive spring 16 and rocking lever 27.

Pivotally journalled on a pin 63 secured to the housing 1 are the two tension levers 64 and 65, both being under the influence of a wire spring 66 which with a few turns also surrounds the pin 63 and bears with one of its ends against the lug 64a and with the other end against the pin 67 secured to the lever 65. The spring 66 tends to rotate the lever 64 counterclockwise around the pin 63 and the lever 65 clockwise (Fig. 10).

Lever 64 has one arm which with its hook-shaped end 64b embraces the spring anchoring pin 14 and ends in an oblique portion 64c. The shoulder 64d on the blocking lever 64 lying opposite the lever end 60c bent at a right angle serves to block the movement of the lever 60 when the slide 12 is in untensioned position (Fig. 12). It is shown in Figs. 10 and 11 that with slide 12 tensioned the spring anchoring pin 14 strikes during its forward movement against the oblique lever portion and pivots the blocking lever 64 clockwise thus moving the shoulder 64 out of reach of the intermediate lever 62. In the same way, the other blocking lever 65 cooperates with the spring anchoring pin 15 on the slide 13; with the slide tensioned (Figs. 11 and 12), it is pivoted clockwise against the action of the spring 66 in such a way that its end 65a is lifted out of the pivoting range of the intermediate lever 60b. When both levers 12 and 13 are tensioned, both blocking levers 64 and 65 (Fig. 11) are in neutral position and the shutter release member may be actuated while the intermediate lever idly moves along with it.

The third embodiment of the invention (Figs. 13–15) differs from the examples shown in Figs. 1–12 by the use of compression springs as drive springs instead of tension springs, whereby the construction of the shutter is greatly simplified. The arrangement and shapes of the blades 2 and the blade drive rings 4 and the shape of the release members 6 and 10 are identical with those of the previous examples.

Into the housing 100, a guideway 100a is recessed in the blade drive ring 4 extending tangentially to the path of the drive eye lug 4c; it serves to receive two pressure springs 101 and 102. Screws 103 and 104 inserted across the guideway close it toward the outside and serve as abutments for the springs. Into the inner ends of the springs, tappets 105 and 106 are inserted which during the drive are laterally engaged by the drive eye lug 4c of the blade drive ring 4. The movement of the blade drive ring 4 is limited by the pin 11 carried by the eye lug 4c abutting upon the ends of the arced recess 100b in the housing 100.

Tensioning of the two springs 101 and 102 is effected by the tension lever 107, the handle of which has an extension in the shape of a segment 107a formed at both ends as hooks 107b and 107c, respectively. The segment 107a serves as guide for the tension lever 107 in the arced guideway 100c recessed into the housing 100 and having a lateral slot 100d through which the tension lever 107 extends. Shoulders 109 and 110 are provided at the two ends of the arced guideway 100c which can be engaged by the hooks 107b and 107c of the segment 107, thereby causing the segment to execute a pivoting movement with regard to the arced guideway.

A tension finger 108 is screwed on to the segment 107a; it extends with its finger 108a through a lateral slot 100e in the spring guide way 100a in such a way that the spring tappets 105 and 106 can rest against its curved flanks.

The essential difference between the present and the previous examples consists in that the tension member is used additionally to disengage the energy storage halves not engaged in driving, a function that had been performed formerly by the rocker (27). The mode of operation is as follows:

For tensioning (Fig. 13), the tension lever 107 is moved in the direction indicated by the arrow. At first there is, however, no displacement, since under the influence of the pressure exerted the guide segment 107a is lifted far enough that its hook 107c is disengaged from the shoulder 110, and only then can the segment slide in the guideway 100c. During its further forward movement, the tension lever 107 compresses the spring 102 by one of the flanks of its finger 108a pushing against the spring tappet 106 until the hook under influence of the pressure on the handle of the tension lever snaps behind the shoulder 109 under tilting over of the guide segment 107a. The spring 102 is now tensioned and simultaneously disengaged since the tension lever 107 remains in its present position till the next release.

The other spring 101 was already tensioned at the beginning of the described tensioning movement, but was disengaged so that the previous exposure could take place. The engagement, i.e. the contact of the eye lug 4c of the blade drive ring 4 with the tappet 105 of the spring 101, takes place simultaneously with the release of the tension lever 107 from the shoulder 110. With the engagement, the trigger lever 6 has to support the pressure of the drive spring 101 by its lug 6a resting against the abutment 4a on the blade drive ring 4.

At the release of the shutter (Fig. 14), the spring 101 drives the blade drive ring 4 in clockwise direction while the pin 11 terminates the movement by butting against the opposite end of the recess 100b in the housing.

The next tensioning movement is effected by moving the lever 107 in counterclockwise direction.

What is claimed is:

1. A photographic shutter mechanism comprising a housing a plurality of overlapping shutter blades pivotally mounted on the housing, a blade drive ring rotatable in either direction, a trigger for locking the ring at either of two extremities of its travel, a pen on the ring engaging in slots on the respective blades for moving the blades about their pivots as the ring is rotated, a driving lug for the ring, a guideway in the housing, a pair of slide members in the guideway and substantially tangential to the ring and located respectively upon opposite sides of the ring driving lug, spring means for urging the slide members along the guideway toward each other, and a lever pivotally mounted on the housing and including a detent for relatively moving the slide members outwardly along their path to stress the spring means, the detent restraining one of the members in its outward position, the other member being restrained by the driving lug as the trigger locks the blade ring in one extremity of its travel so that upon the releasing of the trigger the spring means moves only the other member to rotate the ring to the other extremity of its travel to pivot the shutter blades.

2. A photographic shutter mechanism comprising a housing a plurality of overlapping shutter blades pivotally mounted on the housing, a blade drive ring rotatable in either direction, a trigger for locking the ring at either of two extremities of its travel, a pin on the ring engaging in slots on the respective blades for moving the blades about their pivots as the ring is rotated, a driving lug for the ring, a guideway in the housing, a pair of slide members in the guideway substantially tangential to the ring and located respectively upon opposite sides of the ring driving lug, a spring interconnecting the two slide members for urging them along the guideway toward each other, a lever pivotally mounted on the housing and including a detent for relatively moving the members outwardly along their path to stress the spring, the detent restraining one of the slide members in the outward position, the other slide member being restrained by the driving lug as the trigger locks the blade ring in one extremity of its travel so that upon the releasing of the trigger the spring moves only the other slide member to rotate the ring to the other extremity of its travel to pivot the shutter blades.

3. A photographic shutter mechanism comprising a housing, a plurality of overlapping shutter blades pivotally mounted on said housing, a blade drive ring rotatable in either direction in said housing, a trigger for locking the ring at either of two extremities of its travel, pins on the ring engaging slots on the respective blades for moving the blades about their pivots as the ring is rotated, a driving lug for the ring, a guideway in the housing, a pair of slide members in the guideway substantially tangential to the ring and located respectively upon opposite sides of the ring driving lug, two springs one end of each of which engages a respective slide member, anchoring means for attaching the other ends of the springs to the housing whereby the slide members are urged along their path toward each other, a lever pivotally mounted on the housing and having means engageable with the slide member and including a detent for relatively moving the members outwardly along the guideway to stress the springs, the detent restraining one of the members in the outward position, the other member being restrained by the driving lug as the trigger locks the blade ring in one extremity of its travel so that upon the releasing of the trigger the corresponding spring moves only the other member to rotate the ring to the other extremity of its travel to pivot the shutter blades.

4. A photographic shutter mechanism comprising a housing, a plurality of overlapping shutter blades pivotally mounted on said housing, a blade drive ring rotatable in either direction in said housing, a trigger for locking the ring at either of two extremities of its travel, a pin on the ring engaging in slots on the respective blades for moving the blades about their pivots as the ring is rotated, a driving lug for the ring, a guideway in the housing, a pair of slide members in the guideway substantially tangential to the ring and located respectively upon opposite sides of the ring driving lug, two springs one end of each of which is attached to a respective movable member, two arms pivotally mounted on said housing for attaching the other ends of the springs to the housing whereby the movable members are urged along their path toward each other, means for conjointly moving said arms to adjust the stress in the springs, a lever pivotally mounted on the housing and having means engageable with the slide members and including a detent for relatively moving the members outwardly along their path to stress the springs, the detent restraining one of the members in the outward position, the other member being restrained by the driving lug as the trigger locks the blade ring in one extremity of its travel so that upon the releasing of the trigger the corresponding spring moves only the other member to rotate the ring to the other extremity of its travel to pivot the shutter blades.

5. A photographic shutter mechanism comprising a housing having a central aperture with a recessed slot disposed substantially tangential thereto, a plurality of overlapping shutter blades pivotally mounted on said housing and rotatable to cover the central aperture, a blade drive ring mounted on said housing encircling the central aperture so as to rotate in either direction, a trigger for locking the ring at either of two extremities of its travel, a pin on the ring engageable with means on the blades for moving the blades about their pivots as the ring is rotated, a driving lug extending from the ring, a pin on the lug extending into the recessed slot and engageable respectively with the ends of two members slidably disposed in the recessed slot and located respectively upon opposite sides of the ring driving lug, spring means for urging the slidable members along the recessed slot toward each other, and a lever pivotally mounted on the housing and having means connected thereto engageable with the slidable members for moving them outwardly along the recessed slot to stress the spring means, and detents for holding the members selectively in outward position, the detent restraining one of the members in the outward position, the other member being restrained by the driving lug as the trigger locks the blade ring in one extremity of ring travel so that upon the releasing of the trigger the spring means moves only the other member to rotate the ring to the other extremity of its travel to pivot the shutter blades.

6. A photographic shutter mechanism comprising a housing, a plurality of overlapping shutter blades pivotally mounted on the housing, a blade drive ring rotatable in either direction, a trigger for locking the ring at either of two extremities of its travel, a pin on the ring having operative connections with the respective blades for moving the blades about their pivots as the ring is rotated, a driving lug extending from the ring, a guideway in the housing, two members slidably disposed in the guideway substantially tangential to the ring and located respectively upon opposite sides of the lug, the lug being engageable respectively with the inner end of each of the slidable members, one or more springs for urging the slidable members along their path towards each other, and shutter setting means including a pivotally mounted manually operable lever, two arms extending between the lever and the respective slidable members for separably moving the slidable members outwardly along their paths to stress the spring, one of the members being restrained in its separated position by the driving lug as the trigger locks the blade ring in one extremity of ring travel, and a pivotally mounted latch for engaging the inner end of the other slidable member to maintain it in its separated position so that upon the releasing of the trigger the spring moves only the lug restrained member to rotate the ring to the other extremity of its travel to pivot the shutter blades.

7. A photographic shutter mechanism comprising a housing, a plurality of overlapping shutter blades pivotally mounted on the housing, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two members slidably disposed in a guideway substantially tangential to the ring and located respectively upon opposite sides of the lug, the lug being engageable respectively with the inner end of each of the members, one or more springs for urging the slidable members along their guideway towards each other, and shutter setting means including a pivotally mounted manually operable lever, two arms connected respectively to the lever upon opposite sides of the lever pivot, the other ends of the arms being attached respectively to the outer ends of the slidable members, whereby pivoting of the lever separates the slidable members outwardly along the guideway to stress the spring, one of the members being restrained in its separated position by the driving lug as the trigger locks the blade ring in one extremity of ring travel, and a pivotally mounted latch for engaging the inner end of the other slidable members to maintain it in its separated position so that upon the releasing of the trigger the spring moves only the lug restrained member to rotate the ring to the other extremity of its travel to pivot the shutter blades.

8. A photographic shutter mechanism comprising a housing, a plurality of overlapping shutter blades pivotally mounted on the housing, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two members slidably disposed in the guideway substantially tangential to the ring and located respectively upon opposite sides of the lug, a pin projecting from the outer end of each slidable member, one or more springs whose ends are attached to the respective pins to urge the slidable members along the guideway towards each other, and shutter setting means including a pivotally mounted manually operable lever, two arms connected respectively to the lever upon opposite sides of the lever pivot, the other ends of the arms being attached to the respective pins of the slidable members, whereby pivoting of the lever separates the slidable members outwardly along the guideway to stress the spring, one of the members being restrained in its separated position by the driving lug as the trigger locks the blade ring in one extremity of ring travel, and a pivotally mounted latch for engaging the inner end of the other slidable members to maintain it in its separated position so that upon the releasing of the trigger the spring moves only the lug restrained member to rotate the ring to the other extremity of its travel to pivot the shutter blades.

9. A photographic shutter mechanism comprising, a housing, a plurality of overlapping shutter blades pivotally mounted on the housing, a blade drive ring rotatable in either direction, a trigger for locking the ring at either of two extremities of its travel, a pin on the ring having operative connections with the respective blades for moving the blades about their pivots as the ring is rotated, a driving lug extending from the ring, a guideway in the housing, two members slidably disposed in the guideway substantially tangential to the ring and located respectively upon opposite sides of the lug, a pin projecting from the outer end of each slidable member, one or more springs whose ends are attached to the respective pins to urge the slidable members along the guideway towards each other, shutter setting means including a pivotally mounted manually operable lever, two arms connected respectively to the lever upon opposite sides of the lever pivot, the other ends of the arms being attached respectively to the respective pins of the slidable members, whereby pivoting of the lever separates the slidable members outwardly along the guideway to stress the spring, one of the members being restrained in its separated position by the driving lug as the trigger locks the blade ring in one extremity of ring travel, and a pivotally mounted latch for engaging the inner end of the other slidable members to maintain it in its separated position so that upon the releasing of the trigger the spring moves only the lug restrained member to rotate the ring to the other extremity of its travel to pivot the shutter blades, and trigger blocking means including an intermediate lever one end of which is engaged by the trigger so that the intermediate lever is movable conjointly therewith, two blocking levers and a spring for biasing the blocking levers into the path of the intermediate lever to prevent movement both thereof and of the associated trigger, the blocking levers being movable respectively by the pins as the slidable members are moved to their outward positions so that the intermediate lever and trigger are released.

10. A photographic shutter mechanism comprising a housing, a plurality of overlapping shutter blades pivotally mounted on the housing, a blade drive ring rotatable in either direction, a trigger for locking the ring at either of two extremities of its travel, a pin on the ring having operative connections with the respective blades for moving the blades about their pivots as the ring is rotated, a driving lug extending from the ring, a guideway in the housing, two members slidably disposed in the guideway substantially tangential to the ring and located respectively upon opposite sides of the lug, one or more springs for urging the slidable members along the guideway towards each other, shutter setting means including a pivotally mounted manually operable lever, two arms extending between the lever and the respective slidable members for separably moving the slidable members outwardly along the guideway to stress the spring, one of the members being restrained in its separated position by the driving lug as the trigger locks the blade ring in one extremity of ring travel, and a pivotally mounted latch for engaging the inner end of the other slidable member to maintain it in its separated position so that upon the releasing of the trigger the spring moves only the lug restrained member to rotate the ring to the other extremity of its travel to pivot the shutter blades, and means normally positioned to block the operation of the trigger and movable from its blocking position by the slidable members when both members are in their separated positions.

11. A photographic shutter mechanism comprising a housing having thereon a plurality of pivotally mounted overlapping shutter blades, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two members slidably disposed in the guideway substantially tangential to the ring and located respectively upon opposite sides of the lug, one or more springs for urging the slidable members along the guideway towards each other, and shutter setting means including a pivotally mounted manually operable lever, two arms connected respectively to the lever upon opposite sides of the lever pivot, the other ends of the arms being attached respectively to the outer ends of the slidable members, whereby pivoting of the lever separates the slidable members outwardly along the guideway to stress the spring, one of the members being restrained in its separated position by the driving lug as the trigger locks the blade ring in one extremity of ring travel, and a latch having a pivot coaxially disposed with respect to the manually operable lever and a detent at either of its spaced ends, a corresponding one of which detents engages the inner end of the other slidable members to maintain it in its separated position so that upon the releasing of the trigger the spring moves only the lug restrained member to rotate the ring to the other extremity of its travel to pivot the shutter blades.

12. A photographic shutter mechanism comprising a housing having thereon a plurality of pivotally mounted overlapping shutter blades, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two members slidably disposed in the guideway substantially tangential to the ring and located respectively upon opposite sides of the lug, one or more springs for urging the slidable members along the guideway towards each other, and shutter setting means including a pivotally mounted manually operable lever, two arms connected respectively to the lever upon opposite sides of the lever pivot, the other ends of the arms being attached respectively to the outer ends of the slidable members, whereby pivoting of the lever separates the slidable members outwardly along the guideway to stress the spring, one of the members being restrained in its separated position by the driving lug as the trigger locks the blade ring in one extremity of ring travel, a latch having a pivot coaxially disposed with respect to the manually operable lever and a detent at either of its spaced ends, and a hairpin spring mounted on the pivotal axis of the latch with its ends disposed alternatively to be contacted by the driving lug whereby one of the detents is positioned to engage the inner end of the other slidable members to maintain it in its separated position so that upon the releasing of the trigger the spring moves only the lug restrained member to rotate the ring to the other extremity of its travel to pivot the shutter blades.

13. A photographic shutter mechanism comprising a housing having thereon a plurality of pivotally mounted overlapping shutter blades, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two members slidably disposed in the guideway substantially tangential to the ring and located respectively upon opposite sides of the lug, two springs for urging the slidable members along their guideway towards the driving lug, and shutter setting means including a manually operable lever having latching means and a finger interposed between the slidable members for relatively moving the members outwardly to stress the springs, one of the members being restrained in its separated position by the driving lug as the trigger locks the blade ring in one extremity of ring travel, said latching means restraining the lever whereby its finger engages the inner end of the other slidable member to maintain it in its separated position so that upon the releasing of the trigger the corresponding spring moves only the lug restrained member to rotate the ring to the other extremity of its travel to pivot the shutter blades.

14. A photographic shutter mechanism comprising a housing having thereon a plurality of pivotally mounted overlapping shutter blades, a blade drive ring rotatable in either direction, a trigger for locking the ring at either of two extremities of its travel, a pin on the ring having operative connection with the respective blades for moving the blades about their pivots as the ring is rotated, a driving lug extending from the ring, a guideway in the housing, two tappets slidably disposed in the guideway substantially tangential to the ring and located respectively upon opposite sides of the lug, compression springs for urging the respective tappets along their guideway towards the driving lug, and shutter setting means including a slidably mounted manually operable lever having a tappet finger with a latch on either side thereof, said finger being interposed between the relatively slidable members for relatively moving the members outwardly to stress the springs, one of the tappets being restrained in its separated position by the driving lug as the trigger locks the blade ring in one extremity of ring travel, the corresponding latch restraining the lever so that its finger engages the inner end of the other tappet to maintain it in its separated position so that upon the releasing of the trigger the corresponding spring moves only the lug restrained member to rotate the ring to the other extremity of its travel to pivot the shutter blades.

References Cited in the file of this patent

UNITED STATES PATENTS

| | | |
|---|---|---|
| 478,909 | Blair et al. | July 12, 1892 |
| 961,192 | Wollensak | June 14, 1910 |
| 1,117,009 | Duncan | Nov. 10, 1914 |
| 1,166,921 | McPhee | Jan. 4, 1916 |
| 1,214,250 | Wollensak | Jan. 30, 1917 |